UNITED STATES PATENT OFFICE.

GEORGE W. ABELL, OF INDIANAPOLIS, INDIANA.

COMPOSITION OF MATTER.

SPECIFICATION forming part of Letters Patent No. 449,653, dated April 7, 1891.

Application filed February 24, 1891. Serial No. 382,587. (No specimens.)

*To all whom it may concern:*

Be it known that I, GEORGE W. ABELL, a citizen of the United States, residing at Indianapolis, in the county of Marion and State of Indiana, have invented certain new and useful Improvements in Composition of Matter to be Used as a Plaster in Covering Walls and other Surfaces; and I do declare the following to be a full, clear, and exact description of the invention, such as will enable others skilled in the art to which it appertains to make and use the same.

My composition consists of the following materials or ingredients combined in substantially the proportions and manner set out, viz: one part cream of tartar, one part mineral or bone phosphate, twenty-five parts pulverized bone, using from five to fifty pounds of the mixture formed by these three elements or ingredients with four hundred pounds of ground gypsum. Then add eight hundred pounds of sand, with sufficient water to produce by mixing a mortar or plaster of the consistency desired. The first three ingredients when mingled thoroughly act as a retarder, and after they are mingled together they may be combined with the ground gypsum either before, during, or after calcination.

This composition forms a plaster or mortar possessing great adhesiveness, hardness, and excellence of finish and cheapness, and altogether a superior plaster for covering walls and other surfaces.

I am aware that ground gypsum, sand, and water have been used in making mortar or plaster; but I am not aware that said other ingredients, or any of them, have ever been so used before.

What I claim, and desire to secure by Letters Patent of the United States, is—

The herein-described composition of matter to be used for covering walls and other surfaces, consisting of cream of tartar, mineral or bone phosphate, pulverized bone, ground gypsum, sand, and water, in proportions and union substantially as specified.

In testimony whereof I affix my signature in presence of two witnesses.

GEORGE W. ABELL.

Witnesses:
 JOHN T. LECKLIDER,
 ROBERT DOUGLASS.